Sept. 5, 1944.   J. J. NELSON   2,357,488
RECOVERY OF VANADIUM
Filed Oct. 3, 1942
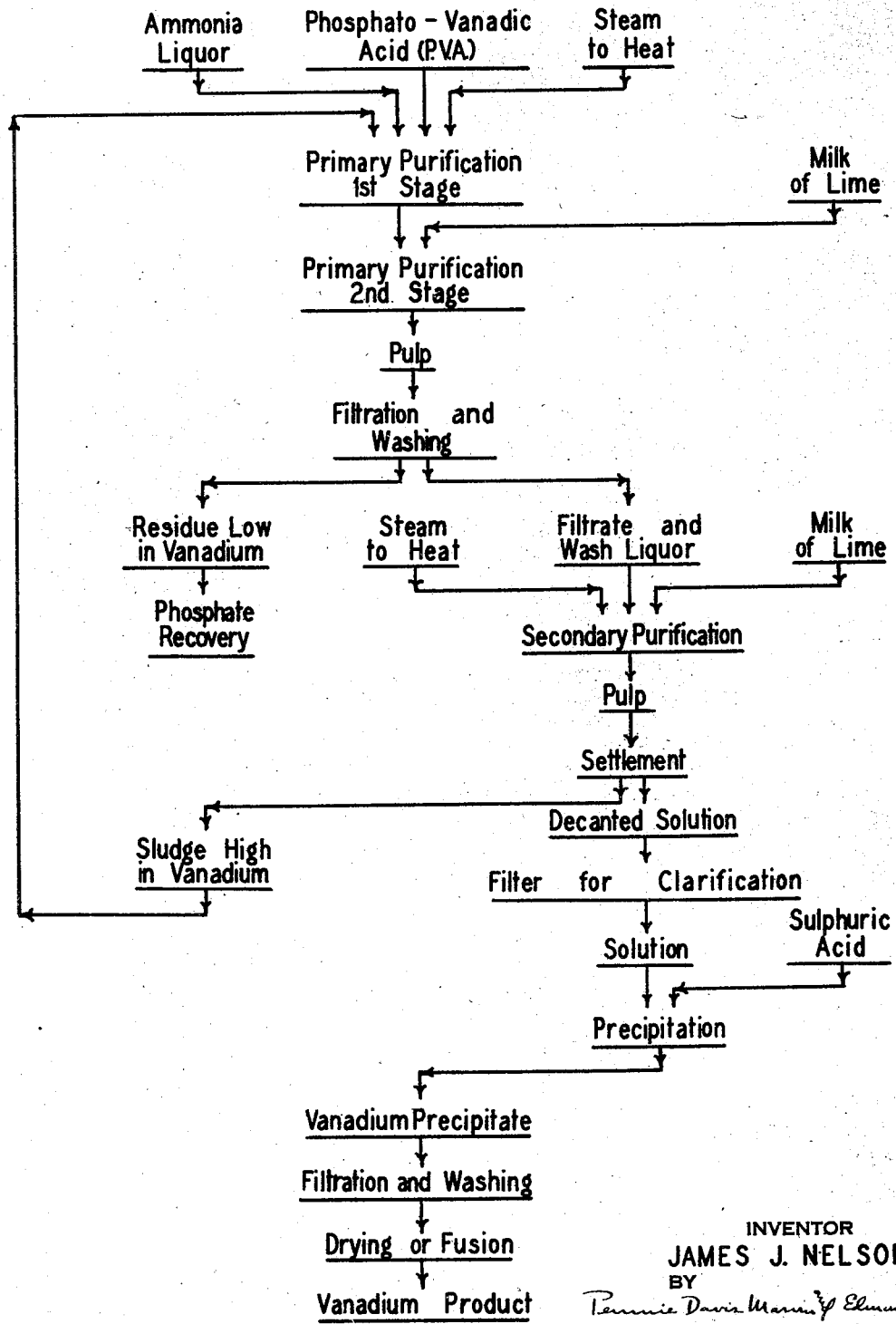
INVENTOR
JAMES J. NELSON
BY
ATTORNEYS Patented Sept. 5, 1944

2,357,488

UNITED STATES PATENT OFFICE 2,357,488

RECOVERY OF VANADIUM

James Joseph Nelson, Anaconda, Mont., assignor to Anaconda Copper Mining Company, a corporation of Montana Application October 3, 1942, Serial No. 460,625

4 Claims. (Cl. 23—24)

This invention relates to the recovery of vanadium, and is concerned more particularly with the provision of an improved method for recovering commercially pure vanadium compounds from material initially containing high percentages of impurities, especially phosphorus. A particular object of the invention is to provide an improved process for separating the vanadium and phosphorus present in substantially water-insoluble complex compounds of phosphorus and vanadium.

The new method is particularly useful for the separation and recovery of vanadium from phosphato-vanadic acids (commonly referred to as P. V. A.). Phosphato-vanadic acids are the complex hydrates of vanadic and phosphoric pentoxides. They are frequently produced as a by-product in the manufacture of phosphoric acid from phosphate rock containing vanadium. When the rock is leached with sulphuric acid, most of the vanadium contained therein goes into solution in the tetravalent form. When the impure phosphoric acid is evaporated to 53° Bé. and treated under suitable conditions with an oxidizing agent such as sodium chlorate, the tetravalent vanadium is oxidized to the quinquevalent form, in which form it combines with phosphoric acid to form hydrates, such as

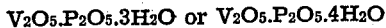

$V_2O_5.P_2O_5.3H_2O$ or $V_2O_5.P_2O_5.4H_2O$

These hydrates (or phosphato-vanadic acids) are yellow crystalline compounds substantially insoluble in water at ordinary temperatures, and easily separated from the phosphoric acid by settlement and filtration. They constitute an important source of vanadium, but the vanadium therein must be separated from the associated impurities.

As indicated above, P. V. A. contains phosphorus as an important constituent, and as obtained in the manufacture of phosphoric acid is associated with impurities such as gypsum, silicofluorides, iron, and alumina. As vanadium is most commonly used in vanadium alloy steels, and as phosphorus is a highly undesirable impurity in steel, the elimination of phosphorus from vanadium compounds destined for steelmaking is of the utmost importance. Vanadium pentoxide for steel-making should contain about 50% or more vanadium and must not contain more than 0.02% phosphorus. P. V. A. generally contains about 21% vanadium and 14% phosphorus. Since these elements are similar in chemical properties, the problem of recovering vanadium from P. V. A. in a vanadium pentoxide product suitable for the production of ferrovanadium to be used in the manufacture of vanadium alloy steels has been difficult of solution.

One process that has been used commercially and with good success for recovering vanadium in commercially pure form from P. V. A. is described in United States Patent No. 2,193,092, granted on the application of F. F. Frick and F. W. Woodman. This process involves the treatment of impure vanadium-phosphorus bearing material (such as P. V. A.) with carefully controlled amounts of milk of lime and soda ash under carefully controlled conditions so that an insoluble residue containing virtually all the phosphorus and a small amount of the vanadium is separated from a substantially pure sodium vanadate solution. The sodium vanadate solution is treated with sulphuric acid under carefully controlled conditions to precipitate substantially insoluble di-sodium hexavanadate. This product, upon drying, runs 89% to 90% $V_2O_5$ and 8% to 9% $Na_2O$.

I have discovered that impure phosphorus-vanadium products, such as P. V. A., may be treated effectively with ammonia or an ammoniacal liquor and with an alkali earth metal hydroxide to achieve separation of the product into a substantially insoluble phosphorus-bearing product and a soluble vanadium-bearing product. The vanadium-bearing product is an ammonium compound, which, upon heating to a sufficiently high temperature, decomposes with the liberation of ammonia and the formation of a substantially pure vanadium oxide product, containing an appreciably higher percentage of $V_2O_5$ than it is possible to secure from the product produced by the milk of lime and soda ash process described in the Frick and Woodman patent noted above.

Based on my discovery, the present invention contemplates the provision of a method for recovering vanadium from impure phosphorus-vanadium material which comprises treating said material in an aqueous medium with ammonia and an alkali metal hydroxide in such proportions as to convert the bulk of the phosphorus component of said material to a substantially water-insoluble compound and to convert the bulk of the vanadium component to a water-soluble ammonium-vanadium compound. The water-insoluble phosphorus compound is separated from the resulting solution of the ammonium-vanadium compound, and thereafter the vanadium is precipitated from the solution as a substantially water-insoluble ammonium-vanadium compound.

Advantageously, in the treatment of P. V. A. by the herein described process, the P. V. A. is treated with ammonia in the form of aqueous ammonium hydroxide and with milk of lime as the alkali metal hydroxide. The initial treatment with these reagents may be such that the bulk of the phosphorus, but not all, is converted to a substantially insoluble product, while substantially all of the vanadium is converted to water-soluble form. After separation of the thus initially formed phosphorus-bearing precipitate (containing a minimum of vanadium), the solution may be treated with a further quantity of milk of lime sufficient in amount to precipitate virtually all the remaining phosphorus, along with some vanadium, leaving a vanadium-bearing solution substantially free of phosphorus. The precipitate, containing some of the vanadium, may be retreated in the process for the recovery of its vanadium content. The vanadium-bearing solution, after separation of the phosphorus, may be treated to effect precipitation of a water-insoluble ammonium vanadium compound. This compound, after separating from the residual solution, may be heated for drying and to effect decomposition into ammonia (which may be recovered for reuse in the process) and substantially pure vanadium pentoxide.

By way of illustration, an embodiment of the invention in a process for the treatment of phosphato-vanadic acid is described in some detail below with particular reference to the accompanying flow sheet. Although the process specifically described below is, at present, my preferred process for the treatment of P. V. A., it is understood that the following description is by way of illustration, and that modifications may be made in the specifically described process without departing from the scope of the invention.

The P. V. A. for treatment is separated by filtration, centrifuging, or decantation from the phosphoric acid solution from which it is precipitated, and is washed with water, or it may be obtained otherwise from any other source. In the process herein specifically described by way of example, the P. V. A. is treated to separate the vanadium from the associated phosphorus and other impurities in two main steps, primary purification and secondary purification. Primary purification advantageously is conducted in two stages with no separation of solids from solution until after the second stage of the treatment is completed, at which time the pulp is filtered. Secondary purification is conducted in one stage with separation of the solids from the solution, after completion of the operation, by decantation, filtration, or other suitable means.

In the step of primary purification, a charge of P. V. A., containing about 21% vanadium and about 14% phosphorus, is introduced in aqueous suspension into a suitable tank, wherein the suspension is agitated. Impure vanadium-bearing residue from the secondary purification step of a previous cycle of the process is introduced into the tank along with the fresh P. V. A. Live steam is admitted to the tank to heat the pulp. Ammonia, advantageously in the form of aqueous ammonia liquor containing about 26% $NH_3$, is added to the pulp in the proportion of about 1 pound $NH_3$ to each 10 pounds of P. V. A. The ammonia serves to convert the P. V. A. to soluble ammonium vanadates and phosphates. Sufficient ammonia is added to insure substantially complete conversion of the vanadium in the charge. The following reactions appear to take place during the agitation of the pulp with ammonia:

(1) $P_2O_5.V_2O_5.3H_2O + H_2O \rightarrow 2H_3PO_4 + 2HVO_3$
(2) $HVO_3 + NH_4OH \rightarrow NH_4VO_3 + H_2O$
(3) $H_3PO_4 + 2NH_4OH \rightarrow (NH_4)_2HPO_4 + 2H_2O$ As indicated in Reaction No. 2 above, the vanadium is substantially completely converted to the form of soluble ammonium metavanadate. As the solubility of ammonium metavanadate is considerably less in cold water than in hot water, it is advantageous to maintain a sufficient supply of steam to the pulp in the tank to maintain its temperature throughout at about 60° C. Also, the pulp advantageously is agitated during the ammonia treatment to insure thorough reaction with the ammonia. Agitation of the pulp with the ammonia liquor is continued for a sufficient period of time (usually about one hour) to bring about substantially complete dissolution of the vanadium.

After completion of the period of agitation with ammonia, the pulp, without separation of solids from the solution, is subjected to the second stage of primary purification by the controlled addition of an alkali metal hydroxide, such as slaked lime (calcium hydroxide). Lime has a preferential affinity of phosphorus over vanadium, and under suitably controlled conditions forms calcium phosphate in preference to calcium vanadate. The objective of the lime addition is to convert as much as possible of the phosphorus to an insoluble phosphate, while holding as much as the vanadium as possible in solution in the form of soluble ammonium metavanadate, so that separation of the phosphorus from the vanadium by decantation or filtration can be achieved. Consequently, lime in the form of milk of lime, is added to the steam-heated pulp in a carefully controlled amount sufficient to convert the bulk but not necessarily all of the phosphorus to insoluble di-calcium phosphate. Generally, about 1 pound of lime (calculated as CaO) for each 2 pounds of the original P. V. A. is about right, although slightly less than this proportion may sometimes be found advantageous. The pulp should have a pH of about 7 after the milk of lime addition.

It is important that the milk of lime addition at this stage of the process be carefully controlled, for if too much milk of lime is used, an excessive proportion of vanadium will be precipitated. If insufficient lime is added too much phosphorus will remain in solution and complicate further purification. By careful control of the process during the course of the lime addition, it is possible to reduce the phosphorus content of the solution to about 3 to 5 grams per liter, without losing a very substantial proportion of the vanadium. The following reactions are illustrative of what occurs as a result of the milk of lime addition to the ammonia treated pulp:

(4) $H_3PO_4 + Ca(OH)_2 \rightarrow CaHPO_4 + 2H_2O$
(5) $(NH_4)_2HPO_4 + Ca(OH)_2 \rightarrow CaHPO_4 + 2NH_4OH$ Although Reactions Nos. 1 to 5 appear to predominate during the step of primary purification, the chemistry of the process through this step probably is very complex. Phosphorus and vanadium form mono-, di- and tri-basic salts with ammonia and calcium, and the compounds formed in the various stages are difficult of identification. However, it is the end result which is of importance. The results of many cycles show that when the operation is conducted as above described, most of the vanadium is contained in the solution as ammonium metavanadate and most of the phosphorus is in the precipitated residue. After the milk of lime has been agitated with the heated pulp for a sufficient period of time to insure substantial completion of the reactions which occur, the pulp is separated from the solution by filtration, and the filter cake is washed. If the lime addition has been carefully controlled, careful washing of the filter cake will reduce the vanadium remaining therein to not more than 5% of the amount present in the orginal P. V. A. This filter cake may be returned to the phosphoric acid plant from which the P. V. A. was obtained for retreatment to recover the phosphorus and such vanadium as it contains.

The solution from the primary purification step, containing the bulk of the vanadium in solution and about 3 to 5 grams per liter of phosphorus, is next subjected to the secondary purification step. For this purpose the solution is introduced into a tank and is heated with live steam to maintain its temperature at about 60° C. Milk of lime is now added to the solution in sufficient amount to insure precipitation of virtually all the phosphorus remaining in solution. Generally, somewhat more than the amount of lime theoretically required is necessary to reduce the phosphorus in solution to a trace. Some vanadium is unavoidably precipitated along with the phosphorus as a result of the excess addition of lime. The objective of this secondary purification step is to obtain a solution containing a minimum amount of phosphorus, and this can only be accomplished by the concurrent precipitation of some calcium vanadate. Within reason, however, the precipitation of some vanadium at this stage is not serious, because the precipitate is returned to the first stage of primary purification and retreated for the recovery of its vanadium content. The solution advantageously is agitated during the step of secondary purification to insure efficient reaction with the milk of lime. After completion of the reaction, the precipitate is separated from the solution, advantageously by settlement and decantation, followed by filtration for substantially complete clarification of the solution.

As a result of the two purification steps, substantially all of the phosphorus originally present in the P. V. A. is separated from the vanadium, and a substantially pure ammonium metavanadate solution is obtained. In the course of the purification, other impurities in addition to phosphorus are removed, principally with the primary purification residue. Gypsum probably is converted to insoluble lime phosphates; iron, alumina and other metals are thrown out as insoluble phosphates; silico-fluorides probably are converted to insoluble silicic acid and insoluble fluorides; and any rock slimes from the phosphoric acid manufacture are of course separated out with the residue. The solution probably contains other ammonium salts in addition to the ammonium metavanadate, such, for example, as ammonium sulphate, together with small amounts of lime, and phosphorus to the extent of not more than a few hundredths of a gram per liter.

The solution is next treated to precipitate the dissolved ammonium metavanadate as a complex insoluble ammonium-vanadium compound. To this end, sulphuric acid may be added to the solution to precipitate di-ammonium hexavanadate in accordance with the following reaction:

(6) $6NH_4VO_3 + 2H_2SO_4 \rightarrow$
$(NH_4)_2H_2V_6O_{17} + 2(NH_4)_2SO_4 + H_2O$ The hexavanadate may then be separated from the solution by filtration and may be washed to remove insoluble impurities.

An important feature of the new process is that it leads to the production of an ammonium-vanadium compound such as di-ammonium hexavanadate. Such compounds, upon being heated to a sufficiently high temperature (about 300° C.), decompose with the evolution of ammonia gas (which may be recovered by conventional methods for reuse in the process) and substantially pure vanadium pentoxide, substantially in accordance with the following reaction:

(7) $(NH_4)_2H_2V_6O_{17} + Heat \rightarrow 3V_2O_5 + 2NH_3 + 2H_2O$

It is commercially feasible to produce by the new process a vanadium pentoxide product containing upwards of 98% $V_2O_5$, as compared with the product containing 89% to 90% $V_2O_5$, which is the best that it is practical to produce from a di-sodium hexavanadate such as results from the employment of the lime and soda ash process described in the above-mentioned Frick and Woodman Patent No. 2,193,092.

It is of course to be expected that in commercial operations the composition of P. V. A. may vary substantially, and correspondingly varied amounts and proportions of reagents may be necessary. The particular temperature employed and the particular amounts of lime and ammonia added may be altered as required to give the best results. Other departures also may be made from the specifically described procedures and conditions set forth above. For example, the process is not limited in its utility to the treatment of P. V. A., but may be applied with success to the treatment of other impure vanadium-phosphorus materials. Although, in general, it is the best practice to make no separation between solids and solution after completion of the first stage of primary purification, it is of course apparent that solids may be separated at this point, before the solution is subjected to the second stage of primary purification. Although particular reference has been made to the use of milk of lime to precipitate the phosphorus selectively from the vanadium, other alkali earth metal hydroxides may be used effectively for this purpose.

By means of the new process, it is possible to produce commercially pure vanadium pentoxide containing less than the 0.02% limit for phosphorus in products destined for the manufacture of ferrovanadium and vanadium alloy steels.

I claim:

1. The method of recovering vanadium from a material comprising a phosphato-vanadic acid which comprises treating said material in an aqueous medium with ammonia and an alkali-earth metal hydroxide in such proportions as to convert the bulk of the phosphorus component of said material to a substantially water-insoluble compound and the bulk of the vanadium component thereof to a water-soluble ammonium-vanadium compound, separating the water-insoluble phosphorus compound from the resulting solution of the ammonium-vanadium compound, thereafter precipitating the vanadium from the solution as a substantially water-insoluble ammonium-vanadium compound, and separating said compound from the residual solution.

2. The method of recovering vanadium from a material comprising a phosphato-vanadic acid which comprises treating said material in an aqueous medium with ammonia and an alkali-earth metal hydroxide in such proportions as to convert the bulk of the phosphorus component of said material to a substantially water-insoluble compound and the bulk of the vanadium component thereof to a water-soluble ammonium-vanadium compound, separating the water-insoluble phosphorus compound from the resulting solution of the ammonium-vanadium compound, thereafter treating the solution with sulphuric acid in such manner as to cause precipitation of an ammonium-vanadium compound, separating said precipitated compound from the residual solution, and heating the separated compound sufficiently to eliminate ammonia therefrom and form vanadium oxide.

3. The method of recovering vanadium from a product comprising a phosphato-vanadic acid which comprises treating said product in aqueous suspension with ammonia and lime in such proportions as to convert a large proportion of the phosphorus component thereof to the form of a substantially water-insoluble compound and to convert substantially all of the vanadium component thereof to the form of a water-soluble ammonium-vanadium compound, separating the insoluble phosphorus compound from the solution, treating the solution with a further quantity of lime sufficient in amount to precipitate substantially all remaining phosphorus and some of the vanadium as an insoluble product, separating said precipitate from the residual substantially phosphorus-free vanadium-bearing solution, treating said solution in such manner as to precipitate an insoluble ammonium-vanadium compound, and separating said compound from the solution.

4. The method of recovering vanadium from a product comprising a phosphato-vanadic acid which comprises treating said product in aqueous suspension with ammonia and lime in such proportions as to convert a large proportion of the phosphorus component thereof to the form of a substantially water-insoluble compound and to convert substantially all of the vanadium component thereof to the form of a water-soluble ammonium-vanadium compound, separating the insoluble phosphorus compound from the solution, treating the solution with a further quantity of lime sufficient in amount to precipitate substantially all remaining phosphorus and some of the vanadium as an insoluble product, separating said precipitate from the residual substantially phosphorus-free vanadium-bearing solution, treating said solution with sulphuric acid in such manner as to precipitate an insoluble ammonium-vanadium compound, separating said compound from the solution, and thereafter heating the separated compound sufficiently to eliminate ammonia therefrom and form vanadium oxide.

JAMES JOSEPH NELSON.